March 1, 1949. W. C. IFTIGER, SR 2,463,179
COUPLING
Filed Sept. 2, 1944 2 Sheets-Sheet 1
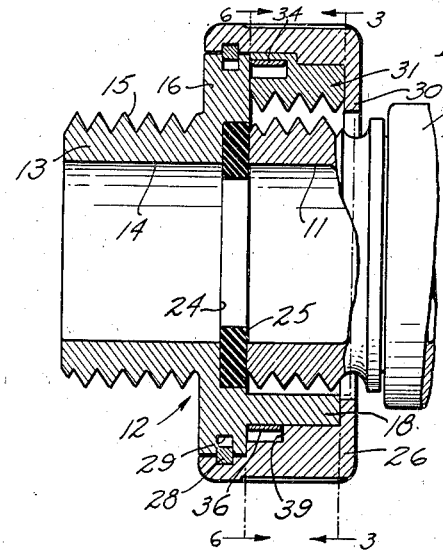
INVENTOR.
William C. Iftiger, Sr.,
BY
Russell L. Otis
ATTORNEY.

March 1, 1949. W. C. IFTIGER, SR 2,463,179
COUPLING
Filed Sept. 2, 1944  2 Sheets-Sheet 2

INVENTOR.
William C. Iftiger, Sr,
BY
Russell N. Ots
ATTORNEY

Patented Mar. 1, 1949

2,463,179

UNITED STATES PATENT OFFICE 2,463,179

COUPLING

William C. Iftiger, Sr., Santa Fe Springs, Calif.

Application September 2, 1944, Serial No. 552,527

7 Claims. (Cl. 285—150)

This invention relates to a coupling, and has a particularly important application in the coupling of a hose or fluid conduit to a faucet, pipe, or other fluid conducting means.

It is an object of my invention to provide a coupling which can be conveniently and rapidly connected and disconnected.

Another object is to provide a threaded female coupling which is adapted to be connected to a threaded male member such as the outlet of a faucet, a pipe, or the like, by simply pushing the female member over the threads of the male member, and which may then be tightened to make a fluid-tight connection by turning a part of the female member through a fraction of a turn, the two members being securely held in coupled relation against any accidental uncoupling, but being adapted to be uncoupled by simply turning the female member back through a fraction of a turn relative to the male member and then pulling it off the male member.

Another object of the invention is to provide a quickly connectible threaded coupling that can be readily converted into a common screw-type coupling by simply turning an outside ring member of the device as far as it will go in the tightening direction, which preferably involves only a fraction of a turn.

Another object is to provide a coupling which can be assembled without any unnatural operations not ordinarily performed in assembling the common screw-type coupling, and which does not require, for tightening, any axial motion of one part relative to another but only a rotary motion through a fraction of one turn.

Still another object of the invention is to provide a coupling that is adapted for cheap manufacture on a large production basis, that is small in size and weight, dependable and fool-proof in its operation, and is durable and of long life.

These and other apparent objects are attained in a manner that will be clear from consideration of the following description taken in connection with the accompanying drawings, of which:

Fig. 1 is a sectional view of my coupling taken along the line 1—1 of Fig. 3, showing the female coupling member in untightened relation with a threaded male member.

Fig. 2 is a partial sectional view of the coupling taken along the line 2—2 of Fig. 5, showing the female coupling member in the tightened coupled relation with the threaded male member.

Fig. 3 is a sectional view of the coupling, in the loosened relation shown in Fig. 1, taken along the line 3—3.

Fig. 4 is a partial sectional view of the coupling similar to Fig. 3 except that it shows a part of the coupling in an early stage of the tightening operation.

Fig. 5 is a partial sectional view of the coupling, taken along the line 5—5 of Fig. 2, showing a part of the coupling in the tightened coupled relation.

Figure 6:
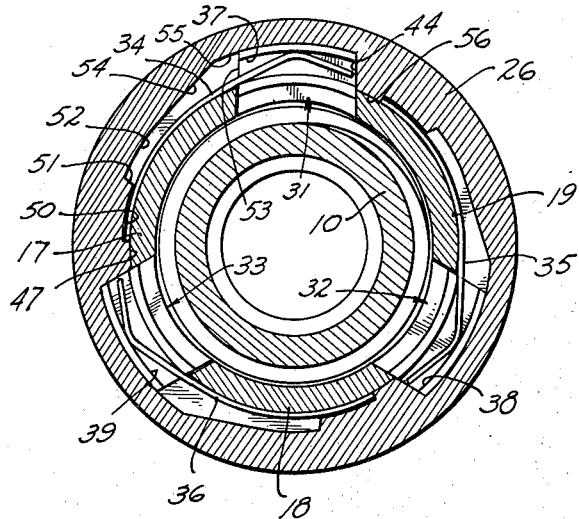
Fig. 6 is a sectional view of the coupling taken along the line 6—6 of Fig. 1.

While the coupling of my invention is adapted to connect a member of any character to any threaded male member of suitable dimensions, whether or not the members to be connected are provided with fluid passages therethrough, I have chosen to disclose herein that important embodiment of my invention in which a female coupling member, having a fluid passage therethrough, is threaded on one end for semi-permanent connection with a fluid conduit such as a hose and on the other end is adapted to be quickly coupled to a threaded male member 10 having a fluid passage 11 therethrough and which male member may constitute the connecting part of a valve or faucet, or the end of a pipe or hose, or the like.

The female coupling member, generally designated by the numeral 12, preferably includes a member 13, having a fluid passage 14 therethrough, and being threaded on the external surface adjacent one end at 15. In the garden hose application of the coupling, the threaded portion 15 is preferably screwed into the rotatable end connection of a hose. The member 13 has a flange 16 extending radially outward which carries a slotted circular cylindrical track extending in an axial direction and consisting, in the presently described embodiment, of three parts 17, 18, and 19 which are in the nature of lugs with radial slots 21, 22, and 23 between, and having arcuate internal and external surfaces. The member 13 is recessed at 24 to receive a compressible washer 25.

Surrounding the member 13 is a ring 26 which is preferably knurled on its external surface at 27 for convenient gripping by the hand, and which is grooved on its internal surface, adjacent the rear end thereof, to receive a spring ring 28, preferably of square cross-section, which retains the ring 26 on the member 13. The flange 16 has in its external surface a groove 29 which is sufficiently deep to accommodate the spring ring 28 while the ring 26 is being assembled over the flange 16. When the ring 26 is assembled in proper position the spring ring 28 snaps outwardly into the groove in the ring 26 and the spring ring 28 acts to prevent the separation of the ring 26 and the member 13 while permitting relative rotation therebetween. Disposed in the slots 21, 22, and 23, respectively, and carried inside the ring 26, are threaded ring sections or jaws 31, 32, and 33, which are threaded internally with a thread corresponding substantially in diameter and pitch to the external thread on the male member 10. These jaws are movable radially in the slots and, when in their radially most inward positions are situated as they would be if they were parts of a complete threaded ring designed to screw on the threaded end of the male member 10. The ring 26 has at its forward end a radial flange 30 directed inwardly, which confines the jaws 31, 32, and 33, and assists in taking the thrust of the jaws when the coupling is tightened.

The jaws 31, 32, and 33 are preferably retained in the ring 26 by springs 34, 35, and 36, respectively, which are preferably formed of resilient sheet material and which reside in grooves 37, 38, and 39, respectively, of the jaws.

The jaws 31, 32, and 33 and the ring 26 are formed so that the springs 34, 35, and 36 are retained within and carried by the ring 26, thereby retaining the jaws also, and so that the ring 26 may rotate through a limited angle relative to the jaws and as it rotates in the tightening direction the ring cooperates with the jaws by cam action to move the jaws to their most inward radial positions where they engage the threads of the male member, and as the ring rotates in the other direction the jaws are retracted by the springs to their most outward radial positions where they can pass entirely over the threads of the male member. To accomplish this the internal surface of the ring 26 is formed differently at its forward side, as viewed in Figs. 3, 4, and 5, from the manner in which it is formed at its rearward side, as viewed in Figs. 6, 7, and 8, and the jaws and springs are given distinctive shapes. In the embodiment disclosed herein, the threads on the male member 10 are considered to be right-hand threads and the jaws and ring of the coupling are shaped accordingly for cooperation with such a threaded male member.

Figure 9:
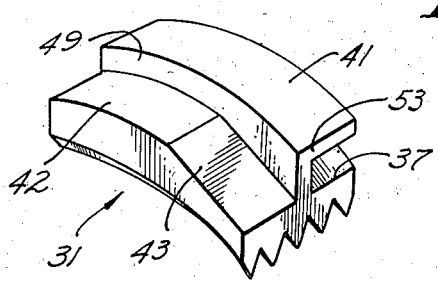
Fig. 9 is a view in perspective, showing one of the threaded jaws forming a part of the female coupling member.

Consider first the shape of the jaws 31, 32, and 33 which are preferably identical except for the axial location of their threads. The jaw 31 adjacent its rearward end face, which is positioned adjacent the flange 16, has an outer surface 41 which is arcuate as are also the inner and outer surfaces of the groove 37 in the end face. In the forward portion of the jaw, at the left side in Fig. 9, the external surface 42 is arcuate and concentric with the surface 41, but has a smaller radius of curvature substantially equal to the radius of curvature of the outer surface of the lugs 17, 18, and 19. The surfaces 41 and 42 form a stepped arcuate external surface on the jaw, the surface 42 being of smaller circumferential extent. At the right side the surface 43 is preferably plane and departs abruptly downward at an angle from the surface 42. The sides of the jaw are preferably plane and parallel.

Consider, now, the shape of the inside of the ring 26 in the forward portion thereof, as viewed in Figs. 3, 4, and 5, and particularly that part which lies adjacent to the jaw 31. A plane surface 44 is situated so as to be alignable with the left side of the slot 21. An arcuate surface 45 then proceeds rightward from the surface 44. The surface 45 preferably has as its center the axis of the coupling and is so located that when the jaw 31 is in its outermost position wherein the jaw 31 will pass axially without substantial interference over the threads of the male member, there is a small amount of clearance between the surface 42 of the jaw and the surface 45. Departing inwardly at an angle from the surface 45 is a plane surface 46 which bears a somewhat similar relation to the surface 45 as the surface 43 bears to the surface 42, except that the surface 46 inclines inwardly more gently than the surface 43, so that as the ring 26 is rotated counterclockwise in Fig. 3 relative to the jaw 31, the inclined surface 46 will first engage the jaw 31 at the corner forming the juncture of the surfaces 42 and 43. Tangent to the surface 46 is an arcuate surface 47 having a center on the axis of the coupling and having a radius of curvature substantially equal to that of the surface 42. The surface 47 is so located that it is substantially in contact with the external arcuate surface of the lug 17 and such that when the ring 26 is rotated on the circular track, consisting of lugs 17, 18, and 19, to its extreme position in the counterclockwise direction relative to the jaw 31, as in Fig. 5, and the surface 42 of the jaw 31 is in contact with the surface 47, the threads of the jaw are engageable with the threads of the male member and the jaw is in the same position relative to the male member as if it were a part of a solid ring designed to screw onto the male member. The surface 47 continues around to meet a surface 48 which is similar to the surface 44. The remainder of the inner surface of the ring then consists of two more portions for cooperation with the jaws 32 and 33 similar to that portion of the ring above described in connection with the jaw 31.

Figure 7:
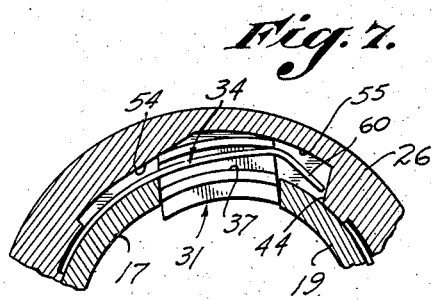
Fig. 7 is a partial sectional view of the coupling similar to Fig. 6 except that it shows a part of the coupling in an early stage of the tightening operation, a stage corresponding to that illustrated in Fig. 4.
Figure 8:
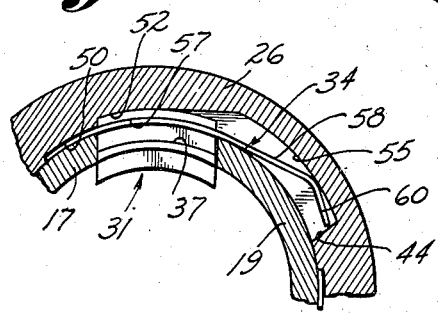
Fig. 8 is a partial sectional view of the coupling, taken along the line 8—8 of Fig. 2, showing a part of the coupling in the tightened coupled relation.

The shape of the internal surface of the ring 26 in the rear portion thereof may be seen in Figs. 6, 7, and 8. An elongated recess 50 is provided to receive one end of the spring 34, the spring being retained and anchored in the recess by engagement of the inner surface of the spring with the lug 17. The recess 50 is, except for clearance, the same depth as the thickness of the spring and preferably has an arcuate surface corresponding to the outer surface of the spring. A plane surface 51 joins the surface of the recess 50 with an arcuate surface 52 having substantially the same radius of curvature as the surface 41 of the jaw 31. The surface 51 bears the same relation to the surface 52 as the side surface 53 of the jaw bears to the outer arcuate surface 41, so that when the ring 26 is moved clockwise, in Fig. 6, to its extreme position, as in Fig. 8, the surfaces 53 and 41 of the jaw substantially match the surfaces 51 and 52. The surface 52 connects with a preferably plane surface 54 which is substantially tangent thereto. The surface 54 inclines toward the exterior of the ring 26 and connects with an arcuate surface 55 having approximately the same radius of curvature as the surface 41 of the jaw 31. The arcuate surface 55 continues over to meet the plane surfaced stop face 44 which is also seen in Fig. 3, 4 and 5. The plane surface 44 connects with a surface 56 similar to the surface 47. The remainder of the rear portion of the internal surface of the ring 26 then consists of two more portions, for cooperation with the jaws 32 and 33 and the springs 35 and 36, similar to that portion of the ring above described.

The extent of the arcuate surface 55 is such that when the ring 26 is moved in a clockwise direction in Fig. 6, the corner of the jaw 31, marking the juncture of surfaces 41 and 53, engages the plane surface 54 at substantially the same time that the plane surface 43 on the other side of the jaw engages the plane surface 46. And the extent of the plane surface 54 is such that as the ring 26 continues in a clockwise direction, in Fig. 6, the corner of the jaw, marking the juncture of surfaces 41 and 53, leaves the plane inclined surface 54 and passes onto the arcuate surface 52 at substantially the same time that the corner, marking the juncture of surfaces 42 and 43 on the other side of the jaw, leaves the plane inclined surface 46 and passes onto the arcuate surface 47. While the jaw is riding on the plane inclined surfaces 46 and 54 it will be noted that the points of the jaw engaging these axially separated inclined surfaces are circumferentially spaced from one another, thereby providing stability of the jaw against tilting as it moves. The plane surfaces 46 and 54 being tangent to the arcuate surfaces 47 and 52 results in a smooth transition from the condition in which the jaw is moving inwardly to the condition in which there is only circumferential relative movement between the ring 26 and the jaw.

The springs 34, 35, and 36 are all substantially identical and their relations to the jaws 31, 32, and 33 and adjacent surfaces are substantially identical, and for this reason only the spring 34 will be described in detail. The spring in its natural undeflected state may be seen in Fig. 8. It is preferably of cantilever nature and is preferably made of resilient sheet material. The left portion 57 of the spring is arcuate in shape and has a radius of curvature preferably substantially the same as the external surface of the lug 17. The end of the arcuate portion 57 of the spring 34 is anchored by residing in the recess 50 in which it is retained by the lug 17. The arcuate portion of the spring extends through the arcuate groove 37 of the jaw 31 and over to the beginning of the lug 19 at which point the spring preferably diverges to form a plane portion 58 tangent to the arcuate portion. The straight portion 58 extends until it substantially meets the surface 55 of the ring 26 and then bends sharply so that the straight end portion 60 of the spring is departing inwardly from the surface 55 as it proceeds from left to right in Fig. 8. A small clearance is provided between the end of the spring and the surface 44. It will be clear that the spring is carried by and is movable with the ring 26 in its rotation around the circular track consisting of portions 17, 18, and 19.

The operation of the coupling will now be described. When it is desired to connect the coupling, the ring 26 of the female coupling member 12 is preferably rotated clockwise as far as it will go, as in Fig. 3. In this, the loosened position, the end of the jaw 31 engages the stop face 44 and the other jaws substantially engage the other corresponding surfaces of the ring. The jaws 31, 32, and 33 are all held radially outward in their outermost positions, as in Fig. 6, by the springs 34, 35, and 36, respectively, the surface 41 of the jaw 31 engaging the surface 55 of the ring. In this condition the female coupling member 12 may be slipped straight over the threaded portion of the male member 10 until the end of the male member engages the washer 25, for the jaws are radially retracted to positions that permit them to pass axially over the threads of the male member without substantial interference.

If it is now desired to tighten the coupling it is only necessary to rotate the ring 26 counterclockwise in Fig. 3, or clockwise in Fig. 6, to its extreme position as illustrated in Figs. 5 and 8. As the ring 26 is rotated through the first part of its travel, up to the place where the jaw 31 engages the inclined surface 46, there is substantially no movement of the jaws relative to the lugs 17, 18, and 19.

When the ring 26 is further rotated, however, the jaw 31 engages the inclined surface 46 and also the inclined surface 54 and the jaw is moved radially inward to engage the threads of the male member 10. As the jaw 31 advances along the inclined surfaces 46 and 54 the spring 34 is bearing on the right side of the jaw, as seen in Fig. 7, and urging it outwardly. This causes the jaw to tip in its slot so that its trailing edge advances inwardly into engagement with the male threads before the leading edge of the jaw. This action, illustrated in Figs. 4 and 7, results in a smooth tightening action of the coupling and prevents digging of the jaws into the male threads as the coupling is rotated to tighten it.

As the ring 26 is further rotated the surface 41 comes into engagement with the arcuate surface 52 and the spring 34 goes out of contact with the leading side of the jaw (Fig. 8), while simultaneously the surface 42 of the jaw engages the surface 47. This action results in advancing the jaw radially inwardly and straightening it so that in the extreme tightened condition, shown in Figs. 5 and 8, with the jaw 31 in engagement with the surface 51, the jaws are in full engagement with the threads of the male member and the leading and trailing edges of the jaws project equally inwardly beyond the lugs 17, 18, and 19. It will be seen that full engagement of the threads of the coupling has been achieved by a rotation of the ring 26 through only a small fraction of a turn. A further rotation of the whole female coupling member 12 through an additional small fraction of a turn results in thorough tightening of the coupling. It is important to note that in the entire operation of tightening there is no unnatural movement, but only a continuous small rotation in the same direction as with an ordinary screw coupling.

It should further be noted that, should one care to, it is possible to turn the ring 26 to the extreme tightened position relative to the portion 13 of the female coupling member before it has been inserted over the male member, and thus form a coupling member which may be screwed onto the male member as in the case of any ordinary screw coupling.

An important feature of construction is that in the tightened condition of the coupling both of the external surface elements 41 and 42 are solidly backed up, the surface 41 engaging the surface 47 and the surface 42 engaging the surface 52; and the surface 43 of the jaw 31 connecting the step surfaces 41 and 42 abuts the adjacent shoulder corresponding to the shoulder 39 of the ring 26. Thus, adequate provision is made for absorbing the outward forces and the axial thrust of the jaws on the ring 26.

In disconnecting the coupling it is only necessary to rotate the ring 26 in the loosening direction, namely, clockwise in Fig. 5, until the jaws have been retracted to the fullest extent, and then pull the female coupling member off the male member. As the ring 26 is rotated in the loosening direction, generally the threads of the coupling will be so tightly engaged that the first action is a rotation of the female coupling member as a whole relative to the male member. In this action the coupling is loosened but the threads remain fully engaged. A further rotation of the ring 26 through a small fraction of a turn relative to the portion 13 results in retraction of the jaws into the condition illustrated in Figs. 3 and 6. As this action progresses from the condition shown in Figs. 5 and 8, there is no significant movement of jaws 31, 32, and 33 until they are engaged by the springs 34, 35, and 36. It will be seen (Figs. 7 and 8) that as the ring 26 is turned in a counter-clockwise direction, taking the spring 34 with it, the right end of the jaw 31 is engaged by the spring 34 and is retracted by the spring radially outward through the slot 21. As the action proceeds, the bend in the spring engages the inside wall of the slot 37 and forces the jaw 31 to its outermost position shown in Fig. 6, wherein the surface 41 of the jaw engages the surface 55 of the ring. In this condition, all the jaws are sufficiently retracted to permit the female coupling member 12 to be withdrawn axially from over the male member with substantially no interference between the threaded portions. The entire operation of disconnecting the coupling generally involves a rotation of only a small fraction of a turn.

It should be noted that when the jaw 31 is retracted the spring 34 is most effective in restraining inward movement of the jaw. This is because, as regards inward movement, the spring 34 is very short, being required to bend over the corner of the lug 17 adjacent the slot 21 to permit any inward movement of the jaw 31. The spring is, thus, very stiff for resisting inward movement of the jaw and likewise forces the jaw outward against the surface 55 with great force when the coupling is loosened. This provides an advantage in overcoming the resistance of dirt, corrosion, etc., which may be present after long use. The fact that the bend in the spring 34 engages the jaw 31 at its middle results in uniform application of this great pressure by the jaw against its backing surface 55.

In the foregoing description, the action of the jaw 31 and spring 34 was described in detail, but it will be clear that similar action takes place in the case of the jaws 32 and 33 and springs 35 and 36, respectively.

It is understood that various changes and modifications in design and construction from the coupling disclosed herein may be made without departing from the spirit and scope of the invention as defined in the appended claims.

I claim as my invention:

1. A coupling for connection with a threaded male member, comprising: a member including walls forming a plurality of substantially radial slots; internally threaded jaws disposed in said slots; a ring surrounding said jaws and mounted for rotation relative to said member, said ring being adapted to cooperate with said jaws by cam action to move said jaws radially inwardly when said ring is turned in the tightening direction; and resilient means movable with said ring and acting in cooperation with said jaws to retract said jaws radially outwardly when said ring is turned in a direction opposite to said tightening direction.

2. A coupling for connection with a threaded male member, comprising: a member including a circular track slotted to form a plurality of substantially radial slots; internally threaded jaws disposed in said slots; a ring mounted on said track for rotation relative thereto, the interior of said ring having surfaces adapted to cooperate with the external surfaces of said jaws by cam action to move said jaws radially inwardly when said ring is turned in the tightening direction; and springs carried in said ring and adapted to engage said jaws and retract them radially outwardly when said ring is turned in a direction opposite to said tightening direction.

3. A coupling for connection with a threaded male member, comprising: a member including a circular track slotted to form a plurality of substantially radial slots; internally threaded jaws disposed in said slots; a ring mounted on said track for rotation relative thereto, the interior of said ring having axially separated inclined surfaces adapted to respectively engage circumferentially separated points on said jaws in such manner that said jaws are moved radially inwardly when said ring is turned in the tightening direction; and springs carried in said ring and adapted to engage said jaws and retract them radially outwardly when said ring is turned in a direction opposite to said tightening direction.

4. A coupling for connection with a threaded male member, comprising: a member including walls forming a plurality of substantially radial slots; internally threaded jaws disposed in said slots, each of said jaws having an annular groove therein extending throughout the entire circumferential extent of said jaw; a ring mounted for rotation relative to said member and adapted, in a loosened position, to permit said jaws to move outwardly to a diameter great enough to clear the threads of said male member, and adapted to move said jaws by cam action radially inwardly when said ring is turned in the tightening direction; and cantilever springs residing in said grooves and adapted to urge said jaws outwardly in the loosened position of said ring.

5. A coupling for connection with a threaded male member, comprising: a member including a circular track slotted to form a plurality of substantially radial slots; internally threaded jaws disposed in said slots, each of said jaws having an annular groove therein; a ring mounted on said track for rotation relative thereto, the internal surface of said ring being adapted, in a loosened position, to permit said jaws to move outwardly to a diameter great enough to clear the threads of said male member, and adapted to move said jaws by cam action radially inwardly when said ring is turned in a tightening direction; and cantilever springs, carried in said ring and residing in said grooves, adapted to restrict the inward movement of said jaws in the tightened position of said ring, and to engage said jaws and retract them radially outwardly into engagement with said ring when said ring is turned into the loosened position.

6. A coupling for connection with a threaded male member, comprising: a member including a circular track slotted to form a plurality of substantially radial slots; internally threaded jaws disposed in said slots, each of said jaws having an annular groove in one of the end faces thereof and a stepped arcuate external surface, the inner step being of smaller circumferential extent; a ring mounted on said track for rotation relative thereto and surrounding said jaws, the internal surface of said ring including inwardly inclined surfaces adapted to engage said jaws and move them radially inwardly when said ring is turned in the tightening direction and arcuate surfaces substantially tangent to said inclined surfaces adapted to engage said stepped arcuate external surfaces of said jaws in the tightened position of said ring; and cantilever springs, carried in said ring and residing in said grooves, adapted to engage said jaws and retract them radially outwardly when said ring is turned in a direction opposite to the tightening direction.

7. A coupling for connection with a threaded male member, comprising: a member including a circular track slotted to form a plurality of substantially radial slots; internally threaded jaws disposed in said slots, each of said jaws having an annular groove in one of the end faces thereof, the external surface of each of said jaws comprising a first arcuate surface adjacent the face of said jaw having the groove therein, and a second arcuate surface of smaller circumferential extent located closer to the axis of said coupling and adjacent to the face of said jaw opposite to that containing said groove; a ring mounted on said track for rotation relative thereto, said ring having, adjacent each of said jaws, walls forming an outer arcuate surface and a stop face which in the loosened position of said ring engage, respectively, said first arcuate surface of the adjacent jaw and a side of said jaw, and other walls forming inclined surfaces and inner arcuate surfaces substantially tangent thereto, said inclined surfaces being adapted to engage said jaw adjacent said first and second arcuate surfaces thereof and move it radially inwardly when said ring is turned in the tightening direction, and said inner arcuate surfaces being adapted to engage said first and second arcuate surfaces in the tightened position of said ring; and cantilever springs anchored at one end between said ring and said track, movable with said ring and residing in said grooves, each of said springs being of arcuate shape adjacent the anchored end and inclined outwardly adjacent the other end thereof.

WILLIAM C. IFTIGER, Sr.

REFERENCES CITED

The following references are of record in the file of this patent:

UNITED STATES PATENTS

| Number | Name | Date |
|---|---|---|
| 1,477,440 | Grier | Dec. 11, 1923 |
| 2,001,244 | Ezell | May 14, 1935 |
| 2,327,714 | Iftiger | Aug. 24, 1943 |